United States Patent
Williams et al.

(10) Patent No.: US 11,465,084 B2
(45) Date of Patent: Oct. 11, 2022

(54) METHOD AND SYSTEM FOR RECOVERING FILLER MATERIAL

(71) Applicant: HONEYWELL FEDERAL MANUFACTURING & TECHNOLOGIES, LLC, Kansas City, MO (US)

(72) Inventors: Benjamin Williams, Shawnee, KS (US); Dakota Even, Overland Park, KS (US); Ryan Haberstroh, Shawnee, KS (US); Ehab Dabbagh, Raytown, MO (US)

(73) Assignee: HONEYWELL FEDERAL MANUFACTURING & TECHNOLOGIES, LLC, Kansas City, MO (US)

( * ) Notice: Subject to any disclaimer, the term of this patent is extended or adjusted under 35 U.S.C. 154(b) by 15 days.

(21) Appl. No.: 16/907,667

(22) Filed: Jun. 22, 2020

(65) Prior Publication Data

US 2021/0394099 A1 Dec. 23, 2021

(51) Int. Cl.
*B01D 43/00* (2006.01)
*B29C 71/02* (2006.01)

(52) U.S. Cl.
CPC ............... *B01D 43/00* (2013.01); *C08J 7/08* (2013.01)

(58) Field of Classification Search
CPC .... B01D 43/00; B01D 39/2027; B01D 53/86; C01B 3/26; B01J 23/02
See application file for complete search history.

(56) References Cited

U.S. PATENT DOCUMENTS

| | | | |
|---|---|---|---|
| 3,887,687 A | 6/1975 | Buford | |
| 4,091,077 A | 5/1978 | Smith et al. | |
| 5,843,287 A | 12/1998 | Wicks et al. | |
| 8,205,814 B2 | 6/2012 | Lindsey et al. | |
| 9,422,478 B2 | 8/2016 | Palmas et al. | |
| 9,566,587 B2 | 2/2017 | Warkentin et al. | |
| 2018/0205122 A1 | 7/2018 | Gupta et al. | |

FOREIGN PATENT DOCUMENTS

| | | | |
|---|---|---|---|
| JP | H11116727 A | | 4/1999 |
| KR | 102174941 B1 | * | 11/2020 |

OTHER PUBLICATIONS

KR-102174941-B1;Nov. 2020, KR, :Lee Dongsoo English translation (Year: 2020).*

* cited by examiner

*Primary Examiner* — Walter D. Griffin
*Assistant Examiner* — Cameron J Allen
(74) *Attorney, Agent, or Firm* — Hovey Williams LLP

(57) ABSTRACT

A method of recovering filler material from a polymer material comprises (a) heating the polymer material to a first temperature; (b) heating the polymer material to a second temperature higher than the first temperature resulting in a pyrolyzed material; (c) elutriating the pyrolyzed material to obtain a separated mixture; and (d) filtering the separated mixture to obtain the filler material.

16 Claims, 2 Drawing Sheets

METHOD AND SYSTEM FOR RECOVERING FILLER MATERIAL

STATEMENT REGARDING FEDERALLY-SPONSORED RESEARCH OR DEVELOPMENT

Figure 1:
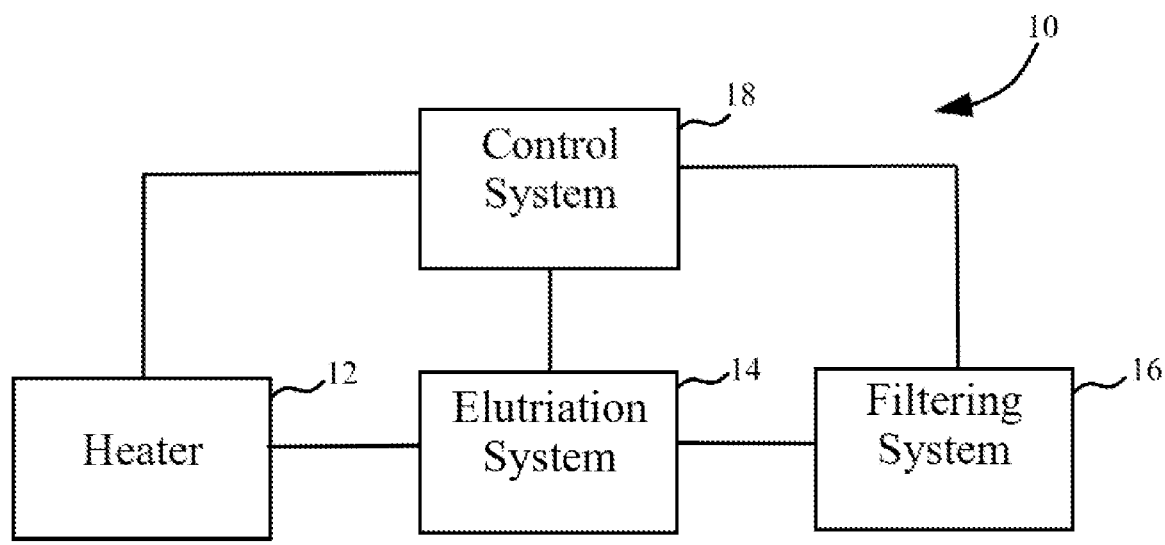

This invention was made with Government support under Contract No.: DE-NA-0002839 awarded by the United States Department of Energy/National Nuclear Security Administration. The Government has certain rights in the invention.

BACKGROUND

Metals, heavy metals, ceramics, and other materials are often added to a polymer matrix as filler material to provide certain properties to a component formed with the polymer matrix. For example, silica may be added to a polymer matrix to increase the strength of a component built with the resulting polymer material. At the end of the component life cycle, it is often desirable to recover the filler material for recycling purposes or resale. However, current solutions for recovering the filler material require a lot of energy and produce significant pollution. Current solutions often use $CO_2$ heating, high energy deagglomeration, and harsh acids for leaching, purification, and other purposes, resulting in undesirable waste and pollution. Existing deagglomeration methods are resource intensive, requiring specialized equipment with high energy and time inputs.

The background discussion is intended to provide information related to the present invention which is not necessarily prior art.

SUMMARY

The present invention solves the above-described problems and other problems and provides a distinct advance in the art of recovering filler material. More particularly, embodiments of the present invention provide methods of efficiently and cost-effectively recovering filler material from polymer matrices.

A method of recovering filler material from a polymer material according to an embodiment of the present invention broadly comprises (a) heating the polymer material to a first temperature; (b) heating the polymer material to a second temperature higher than the first temperature to produce a pyrolyzed material; (c) elutriating the pyrolyzed material to obtain a separated mixture; and (d) filtering the separated mixture to separate the filler material from the remainder of the separated mixture.

In some embodiments, the method may further comprise repeating steps (c) and (d) until a desired amount of filler material has been separated. The filler material may be placed in a carrier fluid to remove any impurities. By using the step-heating process, volatile compounds are removed which prevents the pyrolyzed material from over hardening. This enables the filler material to be separated from the polymer material simply via elutriation and not resource intensive deagglomeration. Additionally, it obviates the need for harsh acids to remove impurities.

Another embodiment of the invention is a system for recovering filler material from a polymer material. The system comprises a heater, an elutriation system, a filtering system, and a control system. The heater is configured to heat the polymer material to a first temperature and then heat the polymer to a second temperature higher than the first temperature to produce a pyrolyzed material. The elutriation system is configured to separate the pyrolyzed material based on density. The filtering system is configured to separate the filler material from the rest of the pyrolyzed material based on particle size and comprises a filter media and an agitator configured to actuate the filter media. The control system is configured to direct the heater to heat the polymer material to the first temperature and then to the second temperature; direct the elutriation system to pump the carrier fluid at the velocity to separate the pyrolyzed material based on density; and to direct the agitator to actuate the filter material.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Figure 2:
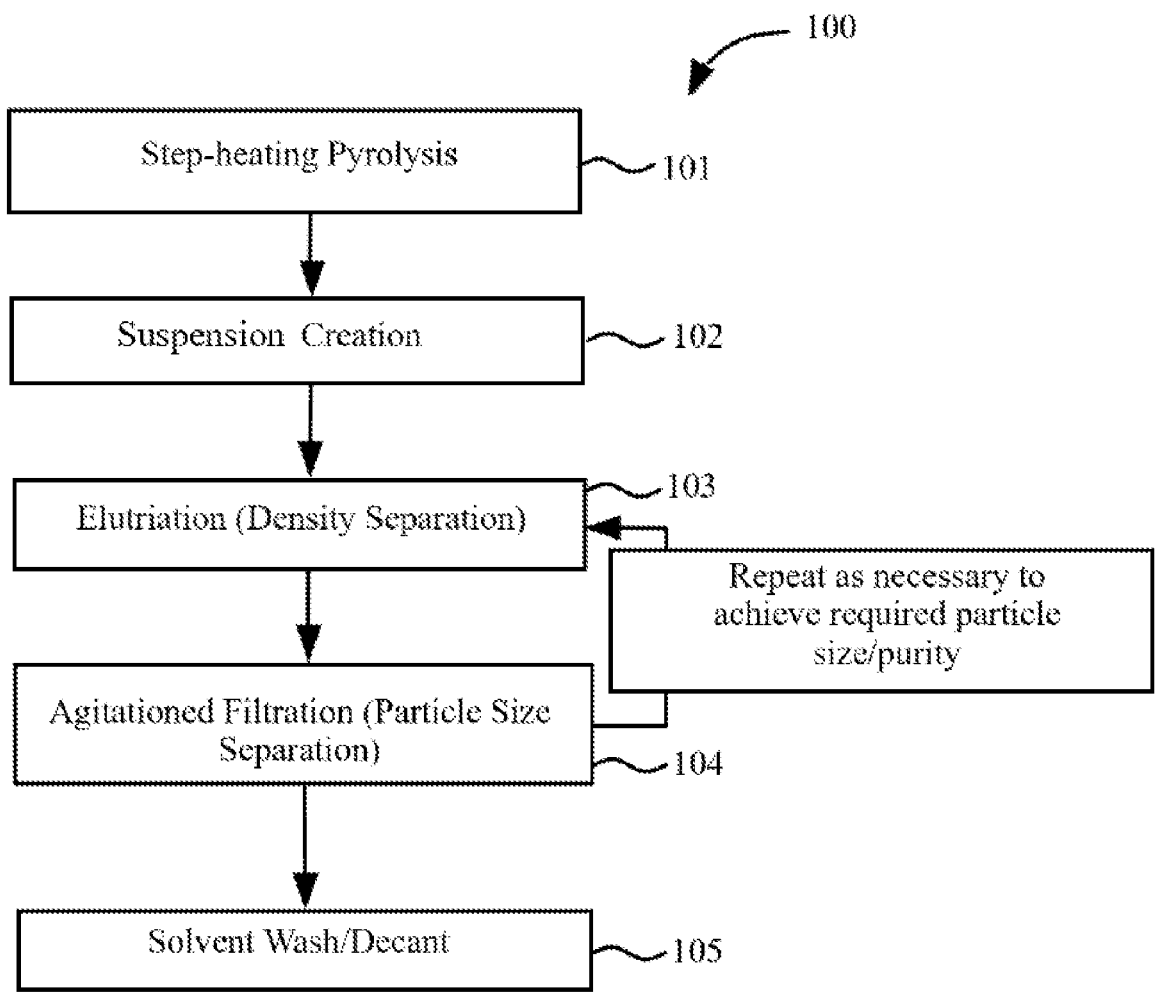

Embodiments of the present invention are described in detail below with reference to the attached drawing figures, wherein:

FIG. 1 is a schematic diagram of a filler material recovery system constructed according to an embodiment of the present invention; and FIG. 2 is a flowchart illustrating at least a portion of the steps for recovering filler material according to an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to FIG. 1, a schematic diagram representing a filler material recovery system 10 constructed according to an embodiment of the present invention is depicted. The system 10 is operable to recover filler material from a polymer matrix composite. The polymer matrix composite comprises a polymer matrix and a filler material. The filler material may comprise ceramic material, fiberglass, graphite, aramid, silicon carbide, silicon nitride, aluminum nitride, metals (such as aluminum, titanium, etc.), including heavy metals (having a density of at least 5 grams per cubic centimeter, such as lead, chromium, copper, iron, nickel, cobalt, etc.), metalloids, or the like. The polymer matrix may comprise thermosets (epoxies, phenolics, etc.), thermoplastics (low density polyethylene, high density polyethylene, propylene, nylon, acrylics, etc.), ethylene-vinyl acetate, silicon, plastic, hard rubber, or the like.

The system 10 comprises a heater 12, an elutriation system 14, a filtering system 16, and a control system 18. The heater 12 is configured to heat the polymer matrix composite. The heater 12 may be operable to heat the polymer matrix composite in an inert atmosphere. For example, the heater 12 may comprise a chamber operable to be filled with an inert gas, such as nitrogen, argon, etc. The heater 12 may be operable to pre-heat the polymer matrix composite to a preheating temperature. In some embodiments, the preheating temperature may be from about 100° C. to about 350° C., preferably about 200° C. to about 325° C., and more preferably about 250° C. to about 310° C. In some embodiments, the preheating temperature may be around 300° C.

The heater 12 may be operable to then heat the polymer matrix composite to a first temperature for removing particular compounds from the polymer matrix composite. The compounds may comprise oxygen-containing molecules, low molecular weight organic compounds, side chains of the polymer matrix composite, volatile compounds, such as hydrocarbons, or the like, which volatilize and can be removed from the polymer matrix composite at the first temperature. Such compounds can cause the pyrolyzed polymer matrix composite to stick together, making it difficult to separate the filler material. Thus, the first temperature may be high enough to remove volatiles and break polymer side chains. By first heating the polymer matrix composite to such a temperature and for a long enough time to burn off the compounds, intense deagglomeration is no longer required to separate the filler material from the pyrolyzed polymer matrix.

Thermogravimetric analysis (TGA) may be used as a precursor step in some embodiments to determine the proper set points for the specific material being pyrolyzed. TGA will provide the specific temperature range (i.e., the first temperature) where volatiles are removed and side chains are broken in addition to the decomposition temperature range (i.e., the second temperature) of the specific material to be separated. In some embodiments, the first temperature may be at least 300° C. In some embodiments, the first temperature may be about 300° C. to about 450° C., preferably about 350° C. to about 420° C. In some embodiments the temperature may be about 400° C. The first temperature chosen will generally depend on the volatile compounds being removed. The heater 12 may be operable to heat the polymer matrix composite at this first temperature for 10 minutes to about 3 hours, preferably about 30 minutes to about 2 hours. In some embodiments, the heater 12 may heat the polymer matrix composite at this first temperature for about one hour. The heating time will generally depend on the volatile compounds being removed.

The heater 12 may be operable to heat the polymer matrix composite to a second temperature higher than the first temperature to break down the polymer matrix composite, or the polymer backbone, thereby producing a pyrolyzed material. In some embodiments, the heater 12 may be operable to heat the polymer matrix composite to a second temperature of about 400° C. to about 500° C., preferably about 450° C. to about 490° C., more preferably about 460° C. to about 480° C. The heater 12 may be operable to heat the polymer matrix composite to the second temperature for about 10 minutes to about 3 hours, preferably about 30 minutes to about 2 hours. In some embodiments, the heater 12 may be operable to heat the polymer matrix composite at this second temperature for about one hour.

The heater 12 may be operable to measure temperatures using a variety of techniques known in the art. For example, the heater 12 may comprise temperature measurement devices, including thermocouples for measuring the pyrolyzed polymer matrix.

The elutriation system 14 is configured to separate the pyrolyzed material based on density. The pyrolyzed material may be placed in a carrier fluid to form a suspension. The elutriation system 14 may comprise a hopper-shaped vessel with a manifold near its bottom and one or more pumps. The pyrolyzed material mixture may be placed through the top of the vessel, and water or another carrier fluid may be pumped from the bottom of the vessel. The pumps may be configured to pump carrier fluid from the bottom of the vessel at a controlled velocity to cause particles less dense than the filler material to float to the top of the vessel while the filler material settles to the bottom of the vessel. The less dense material may be removed from the vessel to produce a density-separated mixture.

The filtering system 16 is configured to separate the filler material from the rest of the pyrolyzed material based on particle size. The filtering system 16 may comprise a vessel, an agitator, filter media, and one or more pumps. The density-separated mixture may be loaded from the top of the vessel and flow through the filter media. The agitator may be configured to actuate the filter media and/or the vessel to prevent the material from agglomerating on the filter media. The pumps may pump water, a carrier fluid, or other liquid from the top of the vessel to provide motive force to push the material with the correct particle size through the filter media. Any size filter media may be used without departing from the scope of the present invention. The filter media size may be selected based on the size of the filler material. The mixture may be elutriated in the elutriation system 14 and filtered in the filtering system 16 any number of times until a desired amount of filler material is obtained.

The control system 18 may comprise any number or combination of controllers, sensors, circuits, integrated circuits, programmable logic devices such as programmable logic controllers (PLC) or motion programmable logic controllers (MPLC), computers, processors, microcontrollers, transmitters, receivers, other electrical and computing devices, and/or residential or external memory for storing data and other information accessed and/or generated by the heater 12, the elutriation system 14, or the filtering system 16. The control system 18 is configured to direct the heater 12 to heat the polymer matrix composite at certain temperatures, including the preheating temperature, the first temperature, and the second temperature. The control system 18 may be configured to detect and/or receive a detected temperature of the polymer matrix composite. The control system 18 may also be configured to direct the pumps of the elutriation system 14 to pump the carrier fluid and or the pyrolyzed material mixture at desired velocities in the vessel; and direct the pumps of the filtering system 16 to pump water into the vessel.

The flow chart of FIG. 2 depicts the steps of an exemplary method 100 of recovering filler material from a polymer material according to an embodiment of the present invention. In some alternative implementations, the functions noted in the various blocks may occur out of the order depicted in FIG. 2. For example, two blocks shown in succession in FIG. 2 may in fact be executed concurrently, or the blocks may sometimes be executed in the reverse order depending upon the functionality involved. In addition, some steps may be optional.

The method 100 is described below, for ease of reference, as being executed by exemplary devices and components introduced with the embodiments illustrated in FIG. 1. However, some of such actions may be distributed differently among such devices or other devices without departing from the spirit of the present invention.

Referring to step 101, the polymer material is pyrolyzed using a step-heating technique. The polymer material may be first pre-heated to a desired preheating temperature to provide uniform heating throughout the polymer material. In some embodiments, the preheating temperature may be from about 100° C. to about 350° C., preferably about 200° C. to about 325° C., and more preferably about 250° C. to about 310° C. In some embodiments, the preheating temperature may be around 300° C.

The polymer material (or pre-heated polymer material) may be heated to a first temperature for removing particular compounds from the polymer material. The compounds may comprise oxygen-containing molecules, low molecular weight organic compounds, side chains of the polymer material, volatile compounds, such as hydrocarbons, or the like, which volatilize and can be removed from the polymer material at the first temperature. Such compounds can cause the pyrolyzed polymer material to stick together, making it difficult to separate the filler material. Thus, the first temperature may be high enough to remove volatiles and break polymer side chains. By first heating the polymer material to a temperature hot enough and for a long enough time to burn off the compounds, intense deagglomeration is no longer required to separate the filler material from the polymer matrix. In some embodiments, the first temperature may be at least 300° C. In some embodiments, the first temperature may be about 300° C. to about 450° C., preferably about 350° C. to about 420° C. In some embodiments the temperature may be about 400° C. The first temperature chosen will generally depend on the volatile compounds being removed. The polymer material may be heated at this first temperature for 10 minutes to about 3 hours, preferably about 30 minutes to about 2 hours. In some embodiments, the polymer material may be heated at this first temperature for about one hour. The heating time will generally depend on the volatile compounds being removed.

The temperature may then be increased to a second temperature to break down the polymer material, or the polymer backbone, thereby producing a pyrolyzed material. In some embodiments, the polymer material may be heated to a second temperature of about 400° C. to about 500° C., preferably about 450° C. to about 490° C., more preferably about 460° C. to about 480° C. The polymer material may be heated to the second temperature for about 10 minutes to about 3 hours, preferably about 30 minutes to about 2 hours. In some embodiments, the polymer material may be heated at this second temperature for about one hour. Such heating pyrolyzes the material without over-pyrolyzing, which would turn the polymer to char and make it more difficult to suspend in water and break apart.

One or more of the heating steps in step 101 may include heating the polymer material in a furnace having an inert atmosphere. For example, the furnace may comprise inert gases such as nitrogen, argon, or the like. The temperatures may be measured using a variety of techniques known in the art.

Referring to step 102, the pyrolyzed material is placed in a suspension. The pyrolyzed material may be added to water or another carrier fluid and mixed to produce a pyrolyzed material suspension.

Referring to step 103, the pyrolyzed material mixture is separated by density. In some embodiments, the pyrolyzed material mixture may be used as a medium for separating the filler material from the polymer material according to density via elutriation. The pyrolyzed material mixture may comprise the filler material and organic silt particles dispersed or suspended in the aqueous solution. The pyrolyzed material mixture may be placed in a vertical elutriation system having a hopper-shaped vessel with a manifold near its bottom. The pyrolyzed material mixture may enter the top of the vessel, and water or another carrier fluid may be pumped from the bottom. The carrier fluid may be pumped from the bottom at a controlled velocity to cause particles less dense than the filler material to float to the top of the vessel while the filler material settles to the bottom of the vessel. The less dense material may be removed from the pyrolyzed material mixture to produce a density-separated mixture.

Referring to step 104, the density-separated mixture may be filtered to separate particles by size to produce a filler material mixture. This step 104 may comprise placing the density-separated mixture in a vessel with an agitator and filter media. The mixture may be loaded from the top of the vessel and flow through the filter media. The agitator may be configured to actuate the filter media and/or the vessel to prevent the material from agglomerating on the filter media. Water, a carrier fluid, or other fluid may continuously flow from the top of the vessel to provide motive force that pushes the material with the correct particle size through the filter media. Any size filter media may be used without departing from the scope of the present invention. The filter media size may be selected based on the size of the filler material. In some embodiments, step 103 and step 104 may be repeated any number of times to achieve a desired purity level of the mixture.

Referring to step 105, the filler material solution may then be decanted and/or subjected to a carrier fluid. The water and other liquid may be removed from the filler material by leaching it with methanol or another carrier fluid to remove oxides or acid compounds formed during processing.

The method 100 may include additional, less, or alternate steps and/or device(s), including those discussed elsewhere herein.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of recovering filler material from a polymer material, the method comprising:

(a) heating the polymer material to a first temperature;
(b) heating the polymer material to a second temperature higher than the first temperature resulting in a pyrolyzed material;
(c) placing the pyrolyzed material in a carrier fluid;
(d) separating the pyrolyzed material according to density to obtain a separated mixture; and
(e) filtering the separated mixture according to particle size to obtain the filler material.

2. The method of claim 1, further comprising placing the filler material in a carrier fluid.

3. The method of claim 1, further comprising repeating steps (d) and (e).

4. The method of claim 1, wherein step (a) comprises pre-heating the polymer material.

5. The method of claim 1, wherein step (a) and step (b) comprise heating the polymer material in an environment comprising inert gas.

6. The method of claim 5, wherein step (a) comprises pre-heating the polymer material in an environment with a temperature of at least 250 degree Celsius.

7. The method of claim 1, wherein the second temperature is at least 400 degrees Celsius.

8. The method of claim 1, wherein the first temperature is high enough to remove hydrocarbon from the polymer material.

9. The method of claim 1, wherein the filler material comprises at least one of a metal or metalloid.

10. The method of claim 1, wherein step (b) comprises heating the polymer material for at least 30 minutes.

11. The method of claim 1, wherein step (d) comprises removing material less dense than the filler material from the separated mixture.

12. The method of claim 1, wherein step (e) comprises using an agitated filter to filter the separated mixture.

13. A method of recovering metallic filler material from a polymer matrix, the method comprising:
(a) heating the polymer matrix to a first temperature for removing volatile organic compounds in the polymer matrix;
(b) heating the polymer matrix to a second temperature greater than the first temperature for pyrolyzing the polymer matrix to form a pyrolyzed material;
(c) placing the pyrolyzed material in a carrier fluid to form a pyrolyzed material suspension;
(d) elutriating the pyrolyzed material suspension to isolate a material less dense than the metallic filler material in the pyrolyzed material suspension;
(e) removing the less dense material from the pyrolyzed material suspension;
(f) filtering the pyrolyzed material suspension via an agitated filter;
(g) repeating steps (d) through (f) to obtain a filtered material;
(h) placing the filtered material in a carrier fluid to form a filler material suspension; and
(i) removing the metallic filler material from the filler material suspension.

14. The method of claim 13, wherein step (a) comprises pre-heating the polymer matrix in an environment with a temperature of at least 250 degree Celsius.

15. The method of claim 13, wherein the second temperature is at least 400 degrees Celsius.

16. The method of claim 13, wherein step (a) and step (b) comprise heating the polymer matrix in a chamber having inert gas.

* * * * *